United States Patent Office 2,952,436
Patented Sept. 13, 1960

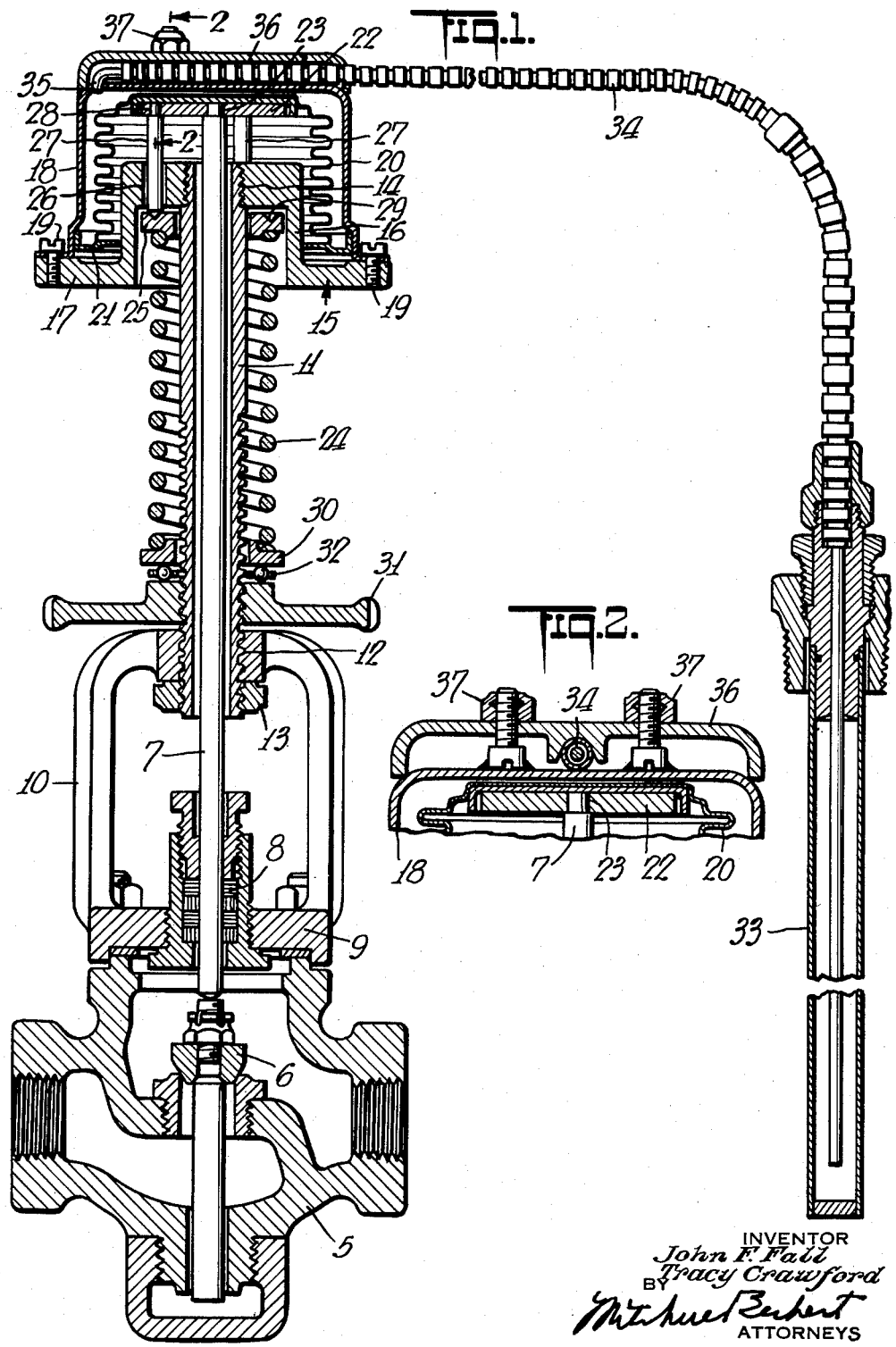

2,952,436
REGULATING VALVE

John F. Fall, New Paltz, and Tracy Crawford, Wallkill, N.Y., assignors to Paulsen Spence, Baton Rouge, La.

Filed Oct. 10, 1955, Ser. No. 539,330

1 Claim. (Cl. 251—61)

Our invention relates to a regulating valve, which may be pressure actuated and thermostatically or otherwise controlled.

It is an object of the invention to provide an improved regulating valve of the character indicated.

It is another object to provide a regulating valve with improved adjusting means located in the open for easy access for manipulation.

It is another object to provide a regulating valve having a single spring adjustment, preferably concentric with the valve stem and arranged for easy access for adjustment.

It is another object to provide an improved bellows arrangement for actuating the valve member of the regulating valve.

Other objects and various features of novelty and invention will be hereinafter pointed out or will become apparent to those skilled in the art.

Briefly stated, in a preferred form of the invention, my improved actuating and adjusting mechanism is associated with a suitable valve having inlet and outlet means and a valve member controlling the passage through the valve. The valve stem projects from the valve body and is actuated by fluid pressure actuated means which may be controlled by thermostatic or other control means. The fluid pressure actuated means is supported in a simple manner from the valve body and an adjusting spring serves to adjust the actuating part of the fluid pressure actuated means. The spring is adjusted by means out in the open, providing ready access for manipulation without possible interference with any part of the valve or the fluid pressure actuated means.

More specifically, the fluid pressure actuated means is supported on a barrel extending upwardly from and carried by the valve body. This barrel is, preferably, concentric with the valve stem which extends therethrough and the spring adjusting means may be a single spring or its equivalent surrounding the barrel. The spring adjustment may consist of a hand-wheel or the like threaded for adjustment on the barrel.

In the drawing, which shows, for illustrative purposes only, a preferred form of the invention:

Fig. 1 is a vertical sectional view through a regulating valve illustrating the invention; and Fig. 2 is an enlarged fragmentary sectional view taken substantially in the plane of the line 2—2 of Fig. 1.

The valve includes a valve body 5 having inlet and outlet passages controlled by a valve member 6 movable in the body in the usual manner. A valve stem or extension 7 passes through a stuffing box 8 and is actuated by means to be later described. The valve body has a top closure or bonnet 9, which carries the stuffing box 8 and may include a yoke or the like 10 which may be secured to or from part of the bonnet or part of the valve body. A part such as the yoke carries a barrel 11, which may be threaded at 12 at the lower end to be received in a threaded bore in the yoke. A lock knot 13 may be employed for securely holding the barrel 11 in place on the bonnet.

The barrel 11 is threadedly or otherwise connected, as indicated at 14, to a bellows or other fluid pressure actuated arrangement which may include a bellows cowl 15 threaded as indicated to the top of the barrel 11. This bellows cowl, preferably, has a depending cylindrical skirt 16 and a lower radial flange 17. A bellows housing or a part of the bellows itself 18 is secured as by means of screws 19 to the bellows cowl, and in the present instance the bellows 20 is hermetically sealed as by means of a bottom plate or flange 21 to the housing 18, which thus may be said to be or become part of the bellows itself.

The bellows 20 surrounds the depending skirt 16 and extends upwardly in the form of a closed cup or bellows. Thus that space around and above the bellows 20 and within the housing portion 18 forms a hermetically sealed space or cavity for the reception of the pressure fluid for actuating the bellows. In the bottom of the cup of the bellows 20 is a pressure plate 22 and, in the form shown, the valve stem 7 after passing through the stuffing box 8 extends up through the barrel 11 and is secured to the pressure plate 22, as indicated at 23. Thus up and down movement of the pressure plate 22, under the influence of pressure at the top of the bellows, will serve to move the valve stem 7 and control the valve member 6.

The bellows is adjusted by spring means which, in the form shown, is in the form of a single spring 24 or its equivalent, surrounding the barrel 11 and at the top engaging a spring button 25 loosely slidable on the barrel. The bellows cowl has a plurality of openings such as 26 for the passage of cone-pointed pins 27, which are secured to the pressure plate 22 as indicated at 28 and the cone points of which engage in an annular V-groove 29 in the spring-button 25. Thus the force of the spring 24 is transmitted through the spring-button 25 and pins 27 to the pressure plate 28, to move the bellows in an expanding direction within the housing 18. Such movement, of course, raises the valve stem 7 and permits opening of the valve member 6. At the bottom, the spring 24 engages the spring-button 30, which is moved as by means of a regulating wheel 31 threaded on the barrel 11, as will be clear. For easy manipulation, there may be a thrust bearing 32 between the hub of the hand-wheel 31 and the spring-button 30.

It will be seen that this adjusting or regulating wheel 31 is threaded on that portion of the barrel between the top of the barrel support in the yoke or bonnet and the fluid pressure or bellows arrangement at the top of the barrel. Thus the regulating wheel is out in the open and freely accessible for actuation in adjusting the spring stress.

In the form illustrated, the bellows is actuated by pressure fluid which, in the form shown, is thermostatically controlled. There may be a thermostat 33 containing a volatile fluid which may pass through the usual capillary tube 34 and into the housing 18 through the hermetically sealed joint 35, as will be clear. A protective or cover cap 36 is secured as by means of nuts 37 to the housing member 18. It will be clear then that pressure from the thermostat 33 will act directly upon the bellows to compress the same and move the valve stem downwardly to urge the valve member toward closed position. The pressure required to close the valve is controlled by the stress of the spring 24, and this in turn is adjusted by movement of the hand-wheel 31.

It will be seen that we have provided a regulating valve which is simple in construction and in which the actuating parts are all concentric with the valve stem. The adjustments are readily made without the necessity of tools simply by turning the hand-wheel 31. The bellows has been shown as being actuated by the thermostatic fluid, but it is to be understood that it might be otherwise actuated, as by direct fluid pressure when a pressure regulating rather than a temperature regulating valve is desired.

While the invention has been described in considerable detail and a preferred form illustrated, it is to be understood that changes may be made within the scope of the invention as defined in the appended claim.

We claim:

A valve comprising a valve body having a passage therethrough, a valve member controlling flow of fluid therethrough and a valve rod engaged at one end with said valve member and extending through said body for actuating said valve member, regulating means for actuating said valve rod comprising a barrel secured at one end to said valve body, said valve rod extending through said barrel, a head secured to the other end of said barrel and having a chamber therein, one end of said chamber being closed by a hat-shaped member having its crown portion secured to the other end of said barrel, a bellows device in said chamber, means securing one end of said bellows to the flange portion of said hat-shaped member, a pressure plate secured to the opposite end of said bellows, means securing the other end of said valve rod to said pressure plate, a washer freely slidable on said barrel and fitting loosely within the crown portion of said hat-shaped member, a compression coiled spring surrounding said barrel and having one end engaging said washer within the crown portion, a plurality of pins extending through the crown portion of said hat-shaped member into said bellows device, said pins at the opposite ends thereof bearing against said pressure plate and said washer respectively, means extending into said head for applying pressure fluid against said bellows and actuating said valve rod for automatic valve regulation, and means for manually adjusting the initial setting of said spring for automatic control comprising a handle member threadedly engaging said barrel at the end secured to said valve body, the other end of said coiled spring engaging said handle, whereby rotation of said handle in one direction compresses said spring.

References Cited in the file of this patent

UNITED STATES PATENTS

| | | |
|---|---|---|
| 970,630 | Locke | Sept. 20, 1910 |
| 1,155,076 | Melcher | Sept. 28, 1915 |
| 1,294,586 | Wilkins | Feb. 18, 1919 |
| 1,589,288 | Hansen | June 15, 1926 |
| 1,995,390 | Hubbard | Mar. 26, 1935 |
| 2,205,814 | Forster | June 25, 1940 |

FOREIGN PATENTS

| | | |
|---|---|---|
| 801,960 | Germany | Jan. 20, 1951 |